(12) United States Patent
Aravamudhan et al.

(10) Patent No.: US 11,961,088 B2
(45) Date of Patent: Apr. 16, 2024

(54) SYSTEM AND METHOD FOR PROVIDING TEMPORAL CARD VERIFICATION VALUE (CVV) FOR SECURE ONLINE TRANSACTION PROCESSING

(71) Applicant: JPMorgan Chase Bank, N.A., New York, NY (US)

(72) Inventors: Sridhar Aravamudhan, Middletown, DE (US); Anishkumar C. Patel, Middletown, DE (US); Rajeev Kumar Balasubramanian, Newark, DE (US); Brian P. Dunphe, Oxford, PA (US); David Christopher Carey, Middletown, DE (US); Jonathan Rosner, White Plains, NY (US); Shruti K. Patel, New York, NY (US); Deepak Joshi, Wayne, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/854,121

(22) Filed: Apr. 21, 2020

(65) Prior Publication Data

US 2021/0326890 A1    Oct. 21, 2021

(51) Int. Cl.
*G06Q 20/40* (2012.01)

(52) U.S. Cl.
CPC .............. *G06Q 20/4018* (2013.01)

(58) Field of Classification Search
CPC ................................................ G06Q 20/4018
See application file for complete search history.

(56) References Cited

U.S. PATENT DOCUMENTS

| | | | |
|---|---|---|---|
| 2003/0028481 A1* | 2/2003 | Flitcroft ................. | G07F 7/122 705/39 |
| 2003/0065624 A1* | 4/2003 | James ................ | G06Q 20/3437 705/64 |
| 2009/0173782 A1* | 7/2009 | Muscato .......... | G06Q 20/40975 235/379 |
| 2010/0293093 A1* | 11/2010 | Karpenko .............. | G06Q 20/40 705/41 |
| 2011/0225089 A1* | 9/2011 | Hammad ................. | G07F 7/12 705/44 |
| 2013/0085938 A1* | 4/2013 | Stone ................. | G06Q 20/3572 705/41 |

(Continued)

*Primary Examiner* — Eric T Wong
(74) *Attorney, Agent, or Firm* — GREENBLUM AND BERNSTEIN, P.L.C.

(57) ABSTRACT

An embodiment of the present invention is directed to a Temporal CVV2 of CVV, which may be represented as a temporary three digit number generated using unique credentials associated with a card product. According to an embodiment of the present invention, the Temporal CVV2 may be generated for each transaction request or other defined set of transactions based on one or more factors, including time period/limit, usage, fraud/risk considerations. With this solution, a customer may request a new Temporal CVV2 each time a purchase is initiated. This may include online purchases, e-commerce transactions, manual link and provision requests, customer authentication for servicing channels, etc. An embodiment of the present invention seeks to mitigate risk and provide a safer and secure solution for customers while providing flexibility to make various purchases before a new card arrives.

20 Claims, 4 Drawing Sheets

(56) References Cited

U.S. PATENT DOCUMENTS

| | | | |
|---|---|---|---|
| 2013/0103581 A1* | 4/2013 | Barry | G06Q 20/351 |
| | | | 705/42 |
| 2013/0144776 A1* | 6/2013 | Webster | G06Q 20/425 |
| | | | 705/38 |
| 2015/0186872 A1* | 7/2015 | Sobol | G06Q 20/351 |
| | | | 705/41 |
| 2016/0027017 A1* | 1/2016 | Chitragar | G06Q 20/202 |
| | | | 705/71 |
| 2017/0053267 A1* | 2/2017 | Abel | G06Q 20/341 |
| 2019/0172058 A1* | 6/2019 | Dottax | G06Q 20/341 |
| 2020/0143381 A1* | 5/2020 | Chhibber | G06Q 20/4018 |
| 2021/0192518 A1* | 6/2021 | Rule | G06Q 20/351 |

* cited by examiner

SYSTEM AND METHOD FOR PROVIDING TEMPORAL CARD VERIFICATION VALUE (CVV) FOR SECURE ONLINE TRANSACTION PROCESSING

FIELD OF THE INVENTION

The invention relates generally to a system and method for generating and providing a Temporal CVV2 for secure online transaction processing.

BACKGROUND OF THE INVENTION

Card verification value (CVV or CVV2) generally refers to a combination of features used in credit, debit and automated teller machine (ATM) cards for the purpose of establishing an owner's identity. Data security standards prohibit vendors, payment gateways and portals from saving any information about CVV2 numbers. Accordingly, requiring CVV2 numbers during a transaction minimizes the risk of fraud. In addition, because the CVV2 numbers are not stored, there is less risk during data security breaches. CVV2 may also be known as card verification code (CVC) or card security code (CSC).

Currently, when a customer applies for a new credit card, the customer is expected to wait between 5-10 days to receive a physical card in the mail. Until the card is received, the customer is not able to use the card for on-line and other purchases. An instant display of a credit card and CVV2 as soon as an account is approved/created may enable customers to use the credentials for online purchase. However, this poses serious fraud risk and most issuing banks would not reveal an actual CVV2 along with the primary account number (PAN) and expiration date (expiry).

These and other drawbacks exist.

SUMMARY OF THE INVENTION

According to one embodiment, the invention relates to a system that generates a Temporal CVV2 for secure transaction processing. The system comprises: an API gateway configured to receive data from one or more customer channels; and a crypto system that comprises a computer processor, coupled to the API gateway, the computer processor further configured to perform the steps of: receiving a request from a customer for a Temporal CVV2 to initiate a transaction with a card number wherein the card number is associated with an account; generating, via a crypto generation processor, a Temporal CVV2 that is associated with the card number wherein the Temporal CVV2 comprises a validity parameter; validating, via a crypto validation processor, the Temporal CVV2 to process the transaction; and communicating, via a secure encryption protocol, the Temporal CVV2 to one or more hardware security servers.

According to another embodiment, the invention relates to a method that generates a Temporal CVV2 for secure transaction processing. The method comprises the steps of: receiving a request from a customer for a Temporal CVV2 to initiate a transaction with a card number wherein the card number is associated with an account; generating, via a crypto generation processor, a Temporal CVV2 that is associated with the card number wherein the Temporal CVV2 comprises a validity parameter; validating, via a crypto validation processor, the Temporal CVV2 to process the transaction; and communicating, via a secure encryption protocol, the Temporal CVV2 to one or more hardware security servers.

The system may be implemented as a specially programmed computer system comprising one or more computer processors, interactive interfaces, electronic storage devices, and networks. The computer implemented system and method described herein provide unique advantages to card holder customers, financial institutions, merchants and other card services entities, according to various embodiments of the invention. An embodiment of the present invention seeks to mitigate risk and provide a safer and secure solution for customers while providing flexibility to make various purchases before a new card arrives. The embodiments of the present invention may be applied to various customer scenarios, including when a customer opens a new account, makes a replacement (e.g., lost or stolen card), after a product trade scenario, reissue, etc. Other benefits include early product engagement and higher spend while lowering operating costs due to reduction in rush shipments and restoring competitive parity. Other scenarios/applications may be supported by the various embodiments of the present invention.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
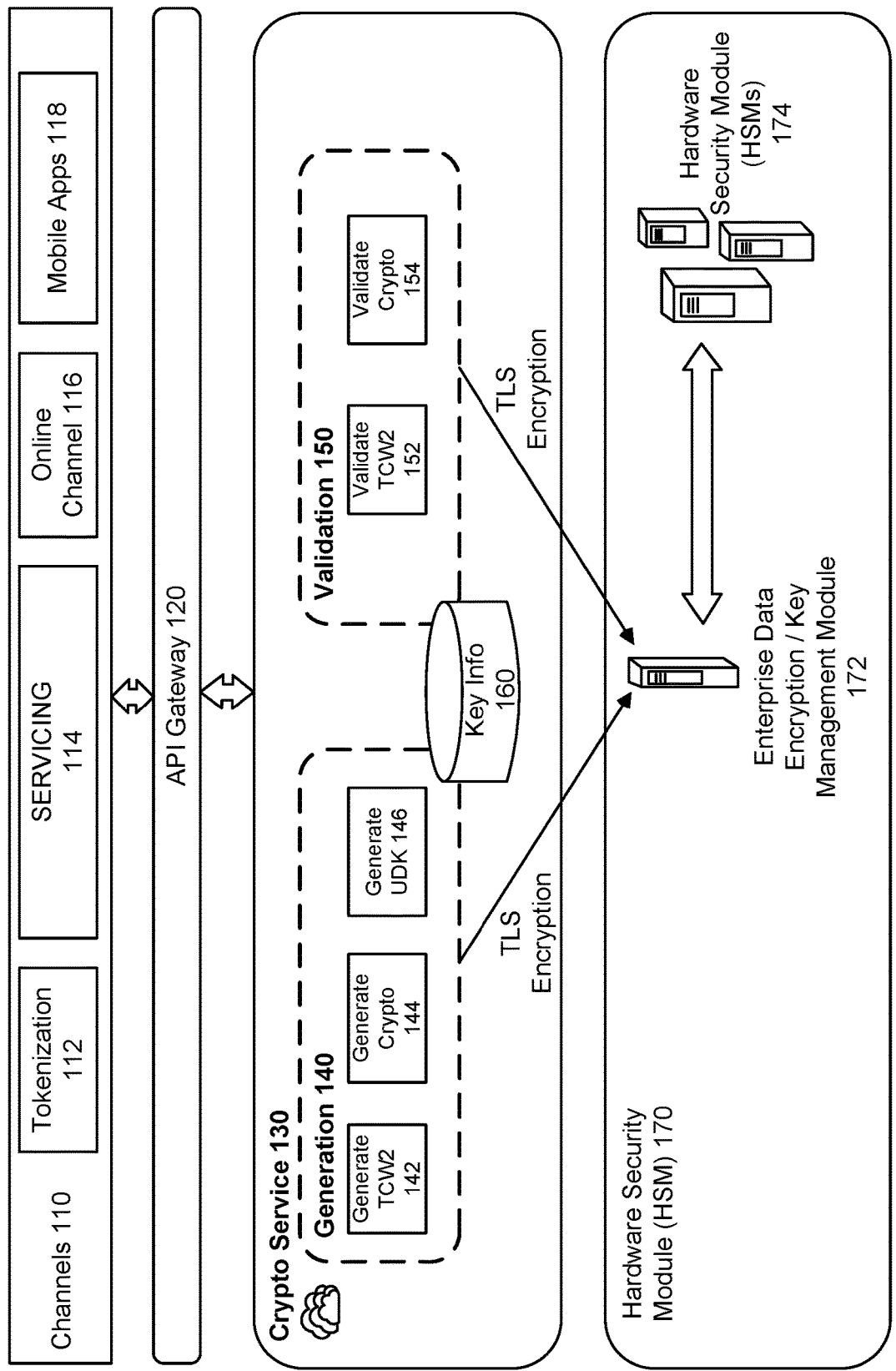
FIG. 1 is an exemplary crypto services architecture, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a Temporal CVV2 (TCVV2), which may be represented as a temporary three digit number generated using unique credentials associated with a card product. In general, CVV and CVV2 represent three digit static values calculated. CVV2 appears on the back of the card and CVV gets embossed to the magnetic stripe of the card. According to an embodiment of the present invention, the Temporal CVV2 may be generated for each transaction request or other defined set of transactions based on one or more various factors. For example, the Temporal CVV2 may be associated with one or more restrictions which may include a time period or time limit. In this example, the Temporal CVV2 may be valid for limited time period, e.g., minutes, hours, days, etc., or until a predetermined event, e.g., end of each day, when the card is received, date, etc. Other restrictions and variations may be applied. With this solution, a customer may request a new Temporal CVV2 each time a purchase is initiated. Also, customers may use the same Temporal CVV2 for multiple transactions within a defined time period or based on other restrictions. Transactions may include online purchases, e-commerce transactions, manual link and provision requests, customer authentication for servicing channels, etc. An embodiment of the present invention seeks to mitigate risk and provide a safer and secure solution for customers while providing flexibility to make various purchases before a new card arrives.

Accordingly, an embodiment of the present invention is directed to enabling customers to make purchases using a newly opened card before the physical plastic card is received. An embodiment of the present invention may be applied to various customer scenarios, including when a customer opens a new account, makes a replacement (e.g., lost or stolen card), after a product trade scenario, reissue, etc. Other scenarios/applications may be supported by the various embodiments of the present invention.

With a new account, a new or existing customer may apply for a new credit card account and receive an approval. Another scenario may involve lost or stolen cards, where a customer may contact an issuing financial institution and report a lost or stolen card. With product trades, customer may contact an issuing financial institution and product trade a current credit card. A natural reissue may occur when a customer's current credit card expires and an issuing financial institution mails a new physical card. With each scenario, customers may use the Temporal CVV2 and new card credentials immediately to purchase online, while waiting for their reissued physical card to arrive in the mail.

Other scenarios may include when a customer forgets their wallet at home, or is away from the customer's wallet (e.g., customer is in the basement while the wallet is in the bedroom). With an embodiment of the present invention, the customer may login to a website or access a mobile application on a mobile device and generate a Temporal CVV2 to initiate an online purchase immediately.

FIG. 1 is an exemplary crypto services architecture, according to an embodiment of the present invention. Channels 110 may communicate with API Gateway 120 which then communicates with Crypto Services 130. Channels 110 may include Tokenization 112, Servicing 114, Online Channel 116 and Mobile Apps 118. Other channels may be supported. Servicing 114 may represent issuer servicing applications, including voice services such as interactive voice recognition (IVR). Crypto Services 130 may include Generation 140 and Validation 150. Generation 140 may include Generate TCVV2 142, Generate Crypto 144 and Generate Uniquely Derived Key (UDX) 146. UDK represents a specific type of crypto used for Tokenization. Validation 150 may include Validate TCVV2 152 and Validate Crypto 154. Key information may be stored and managed by Key Information Database 160. Generation 140 and Validation 150 may communicate with Hardware Security Module (HSM) 170 via a cryptographic protocol, such as Transport Layer Security (TLS) Encryption, Secure Sockets Layer (SSL), etc. Other secure protocols and channels may be implemented. Hardware Security Module 170 may include Enterprise Data Encryption and Key Management Module 172 and Hardware Security Module (HSMs) 174. APIs exposed by Enterprise Data Encryption and Key Management Module may be used to call the HSM services for generation and validation. HSM may represent special hardware produced to perform industry standard security crypto algorithms.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 are depicted, it should be appreciated that other connections and relationships are possible. The system 100 described below may be used to implement the various methods herein, by way of example. Various elements of the system 100 may be referenced in explaining the exemplary methods described herein.

While a single component is illustrated in FIG. 1, each component may represent multiple components. In addition, multiple components may be integrated and/or otherwise combined. Other variations may be supported in accordance with the embodiments of the present invention.

Figure 2:
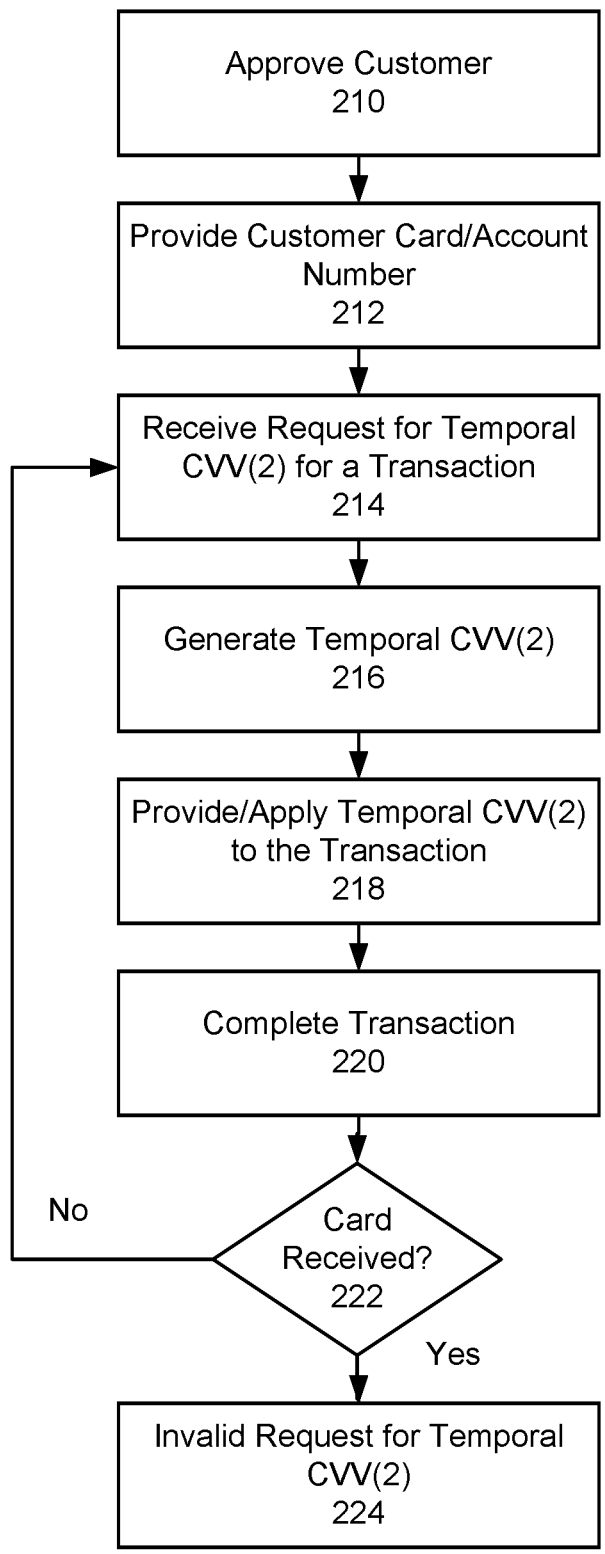
FIG. 2 is an exemplary flow diagram for generating for generating and providing a Temporal CVV2, according to an embodiment of the present invention.

FIG. 2 is an exemplary flow diagram for generating for generating and providing a Temporal CVV2, according to an embodiment of the present invention. At step 210, a customer may be approved for a new card. Other use cases and scenarios involving a new card generation may be realized. At step 212, a card number or identifier may be provided. This may include an expiration date. At step 214, a request for a Temporal CVV2 for a transaction may be received. At step 216, the Temporal CVV2 may be generated for the customer. At step 218, the Temporal CVV2 may be applied to the transaction. At step 220, the transaction may be completed. At step 222, an embodiment of the present invention may determine whether the new card has been received and/or activated by the customer. At step 224, if the new card has been received and/or activated, CVV2 generation may be terminated for the card. If the new card has not been received and/or activated, an embodiment of the present invention may continue to generate Temporal CVV2 in response to a request. While the process of FIG. 2 illustrates certain steps performed in a particular order, it should be understood that the embodiments of the present invention may be practiced by adding one or more steps to the processes, omitting steps within the processes and/or altering the order in which one or more steps are performed. Step may be described in more detail below.

At step 210, a customer may be approved for a new card. Various use cases and scenarios may be applied. Customer scenarios may include when a customer opens a new account, makes a replacement (e.g., lost or stolen card), after a product trade scenario, reissue, etc.

At step 212, a card number or identifier may be provided. This may include expiration date. Upon approving the customer, a card identifier may be generated and communicated to the customer. The communication may occur electronically. For example, the customer may receive a virtual card via a mobile application.

At step 214, a request for a Temporal CVV2 for a transaction may be received. The request may be received via an online portal. The request may also be initiated via a mobile application executing on mobile device, e.g., customer's phone. In addition, a request may be initiated via an electronic wallet or other third party application. The request may be associated with an online or other transaction initiated by the customer. Other transactions may be supported.

According to an embodiment of the present invention, an account may be associated with a single customer or multiple customer (e.g., multiple users of the same card number). In addition, an account may be a customer, small business, or other entity. In this scenario, an embodiment of the present invention may support Temporal CVV2 generation for multiple users on the same or shared account. The users may receive the same Temporal CVV2 or a separate independent Temporal CVV2.

At step 216, the Temporal CVV2 may be generated for the customer. For example, the Temporal CVV2 may be generated dynamically on-the-fly in response to a customer request, without any changes to the card number or expiration date. An embodiment of the present invention may generate a unique CVV2 that may be used to initiate or complete the transaction. The unique CVV2 may be include one or more restrictions, including a time period, time limit, etc. Other restrictions may include number of uses within a time period or time limit. For example, a customer may be limited to a single or threshold number of requests (e.g., maximum 3 requests, usage restrictions, etc.) within a 24 hour time window. According to another example, a customer may be required to make a new request for each transaction or group of transactions (e.g., same or similar merchant). Other variations may be supported.

Other restrictions may be fraud and/or risk related. For example, the Temporal CVV2 may be limited to certain known merchants or excluded from suspect merchants or transaction types. In addition, other restrictions may include geographic (e.g., regional purchases), spend limit (e.g., maximum transaction amount of $250), transaction types, etc. An embodiment of the present invention may incorporate various fraud and/or risk restrictions.

An embodiment of the present invention may implement a validity period associated with a CVV2. The validity period may be represented in minutes, hours, days, etc. The validity period may also be parameter driven. For example, a minimum validity period may be one minute or other lower limit. Other limits and/or restrictions may be applied.

An embodiment of the present invention may incorporate additional parameters and/or vary the number and/or type of parameters (e.g., time, usage, risk factors, etc.) when generating a Temporal CVV2. The addition of parameters may be driven by risk and/or other factors.

An embodiment of the present invention may apply a counter to dynamically generate a Temporal CVV2. For example, a minute counter may start from a start date (e.g., 1 Jan. 2020) and continue to increment every minute, for example. This counter value may be calculated each time a request is received, e.g., a request for Temporal CVV2 generation or validation, based on GMT or any other agreed time zone. For example, 8 Nov. 2020 1:43 PM ET may be translated to 450103 minutes starting from 1 Jan. 2020.

According to an embodiment of the present invention, a mathematical delta of a validity period may be taken against a minute counter and may be supplied to an existing CVV2 calculation algorithm.

For example, validity may be 15 minutes and at 8 Nov. 2020 1:43 PM, a customer requested TCVV2 then a Delta of 450103 to 15 may be supplied to an algorithm. This results in a Temporal CVV2 that may be valid from 13:30 to 13:44. In this example, a current time of 13:43 may only provide two minutes of usage so then a check past a 15 minute window may be applied when TCVV2 validation fails on a first attempt.

For example, validity may be 15 days and at 8 Nov. 2020 1:43 PM, a customer requests a Temporal CVV2 then a Delta of 450103 to 21600 (Minutes in 15 days) may be supplied to an algorithm. This results in a Temporal CVV2 that may be valid from $27^{th}$ October to $10^{th}$ November. Because the current date is $8^{th}$ November, it will only give 3 days of usage so then a check past 15 days period may be applied when Temporal CVV2 validation fails on a first attempt.

An embodiment of the present invention may check for a current and/or past validity window. This may involve two time validations when a first attempt results in a Temporal CVV2 mismatch. In addition, an actual validity period of TCVV2 may vary between a validity parameter period to double of the validity period. Payment networks may not be able to validate Temporal CVV2 in stand-in scenario when an issuer is not available. For example, payment networks and associations may stand in and authorize the transaction on behalf of issuers, if the issuer network is unavailable. In such scenarios, because the Temporal CVV2 algorithm is issuer specific, the payment networks and associations may not be able to validate.

At step 218, the Temporal CVV2 may be applied to the transaction. The customer may provide the Temporal CVV2 during the transaction. According to another embodiment of the present invention, the Temporal CVV2 may be automatically added when the card number is entered. For example, the Temporal CVV2 may be conveyed to the customer via a mobile application executing on a mobile device. Other forms of communication of the Temporal CVV2 may be supported. For example, the CVV2 may be provided via a secure electronic communication, e.g., text, encrypted message, call-center, third-party app message, electronic wallet, etc. The customer may then associate the Temporal CVV2 to a new transaction or current transaction. Other variations may be applied.

At step 220, the transaction may be completed. Upon verification of a valid Temporal CVV2, the transaction may be approved and processing may be initiated.

At step 222, an embodiment of the present invention may determine when the new card has been received and/or activated by the customer. This may occur when the customer activates the new card. This determination may also be made when it has been determined that the customer should have received the physical card after a reasonable time.

At step 224, if the new card has been received and/or activated, CVV2 generation may be terminated for the card. If the new card has not been received and/or activated, an embodiment of the present invention may continue to generate Temporal CVV2 in response to a request.

Figure 3:
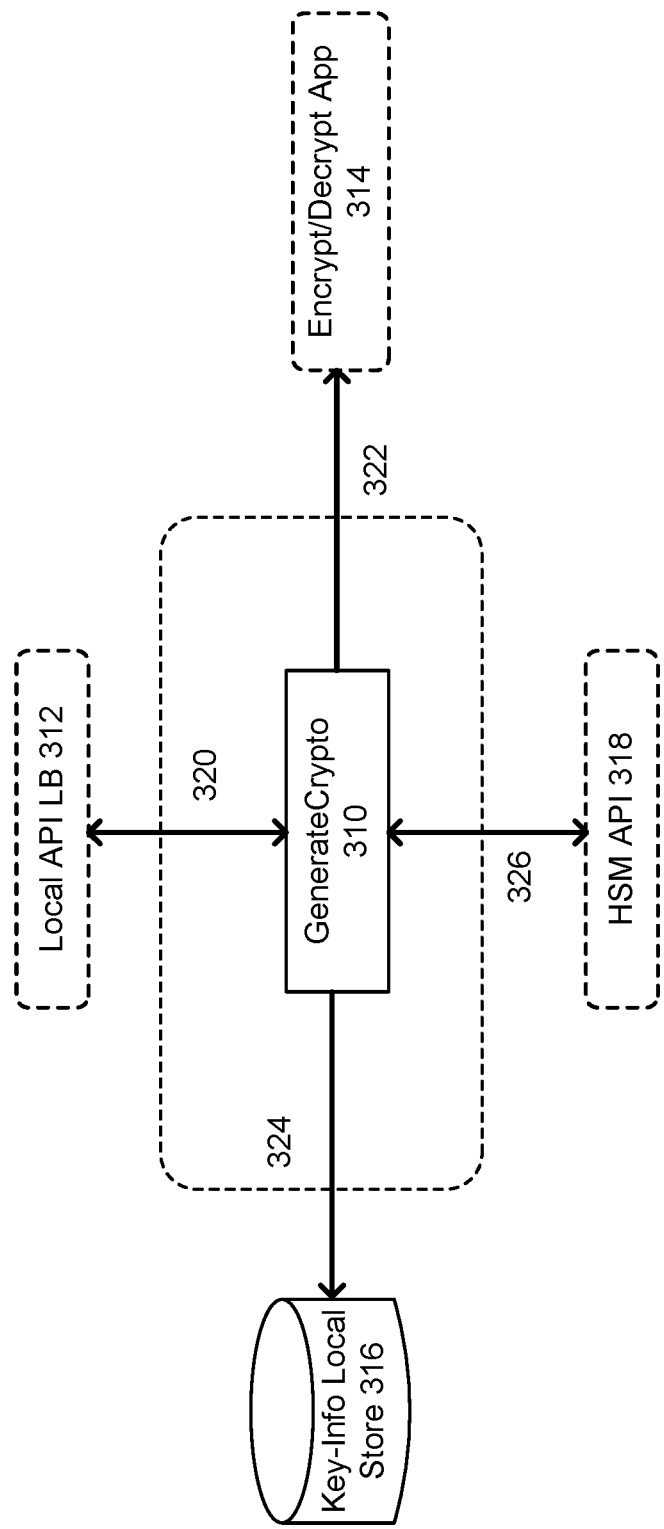
FIG. 3 is an exemplary diagram illustrating crypto generation, according to an embodiment of the present invention.

FIG. 3 is an exemplary diagram illustrating crypto generation, according to an embodiment of the present invention. Applications may invoke a generateCrypto service 310, via 320. Local API Load Balancer (LB) 312 may represent Internal API Gateway. Card number, expiry-date and timed-card-verify flag may be passed encrypted using Encrypt/Decrypt Application 314, via 322. The payload may be decrypted using Encrypt/Decrypt Application 314. GenerateCrypto 310 may fetch key-rack information using the crd-bin, exp from a local database 316, via 324. Based on a timed-card-verify flag, HSM API request may be formatted for the time based CVV2 versus a static CVV2, via 326. HSM API 318 may be called to generate the CVV2 over the TLS layer. The response payment may be encrypted back for Applications using Encrypt/Decrypt Application 314, at 322. The response may then be sent back to Local API LB 312 via 320.

Figure 4:
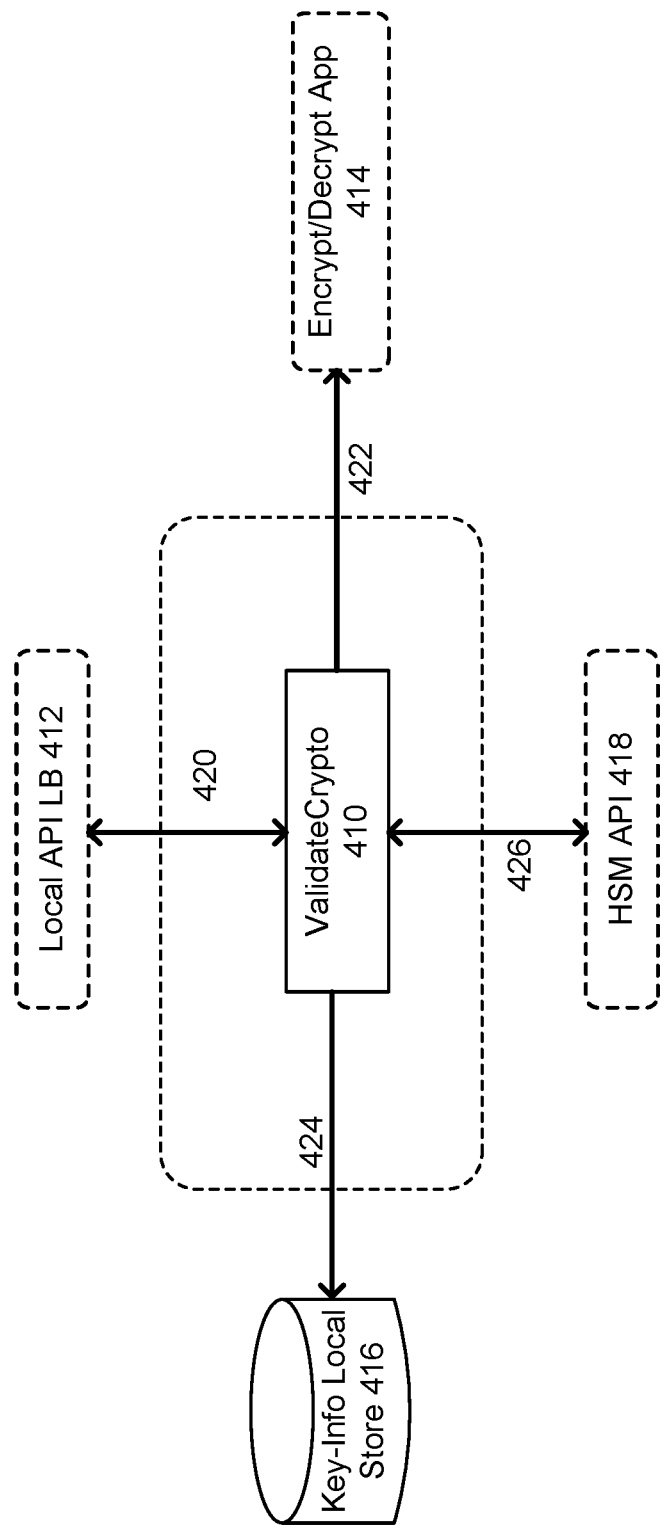
FIG. 4 is an exemplary diagram illustrating crypto validation, according to an embodiment of the present invention.

FIG. 4 is an exemplary diagram illustrating crypto validation, according to an embodiment of the present invention. Applications may invoke a validateCrypto service 410, via 420. Card number expiry-date and CVV2 may be passed encrypted using Encrypt/Decrypt Application 414, via 422. The payload may be decrypted using Encrypt/Decrypt Application 414. ValidateCrypto 410 may fetch key-rack information using the "crd-bin" (card-bank identification number), "exp" (expiration date) from a local database 416, via 424. HSM API 418 may be called to validate a static CVV2 over the TLS layer, via 426. If the response is a success, the response may be sent back to the Application via 420. If the response is a failure, HSM API 418 may be called to validate as a time based CVV2 over the TLS layer, via 426. The response may then be sent back to Local API LB 412 via 420.

An exemplary crypto services workflow may support various interactions, applications and use cases between digital, card services, authorizations and other services. For various use cases, a call may be made to a new TCVV2 service to generate a Temporal CVV2 which may then be sent back to an existing CVV2 field. Eligibility rules may be applied at TCVV2generation. For example, a getTCVV API may generate a Temporal CVV2 each time the API is called. The Temporal CVV2 may be valid for a business driven validity period. In addition, an encrypt/decrypt application may be used to encrypt PCI data (e.g., field level—card number, expiry, CVV2, etc.). Customer interactions may be received via online website, mobile applications and/or other communication channels. When eligibility rules are satisfied, get TCVV2 and validate TCVV2 calls may be made through HSM, for example.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that generates a temporal card verification value (CVV2) for secure transaction processing, the system comprising:
    a server that receives data from one or more customer channels, the customer channels comprising a tokenization channel, a servicing channel, an online channel, and a mobile apps channel; and
    a crypto system that comprises a computer processor, coupled to the server, the computer processor performs each of:
        in response to approving a customer for a new physical card that is not connected to an existing account and providing a card number and expiration date for the new physical card to the customer, receiving a request from the customer for a Temporal CVV2 to initiate a transaction with the card number and expiration date, wherein the card number is associated with a new account that is newly created for the new physical card,
        wherein a risk level is associated with the transaction;
        in response to determining that the new physical card has not yet been received or activated by the customer, generating, via a crypto generation processor, a unique Temporal CVV2 that is distinct from a CVV2 that is printed on the card and associated with the card number;
        applying a counter for the unique Temporal CVV2, wherein the counter is recalculated when a request for a new Temporal CVV2 is received,
        wherein the Temporal CVV2 comprises a validity parameter,
        wherein the Temporal CVV2 adds one or more parameters based on the risk level, and
        wherein the Temporal CVV2 includes one or more restrictions, the one or more restrictions comprising a valid time period and a time limit as well as one or more valid transaction types and one or more approved merchants;
        validating, via a crypto validation processor, the Temporal CVV2 to process the transaction, the validation including a determination that the CVV2 meets the one or more restrictions;
        communicating, via a secure encryption protocol, the Temporal CVV2 to one or more hardware security servers;
        in response to determining that the new physical card has been received or activated by the customer, automatically terminating the unique Temporal CVV2; and
        when the new physical card expires, reissuing another unique Temporal CVV2,
        wherein the unique Temporal CVV2 is crypto encrypted,
        wherein the unique Temporal CVV2 has a maximum number of usage greater than 1, and
        wherein both the unique Temporal CVV2 and the CVV2 that is printed on the physical card share same card number and expiration date.

2. The system of claim 1, wherein the crypto system further comprises a memory component that stores and manages key information associated with the Temporal CVV2.

3. The system of claim 1, wherein the transaction comprises an online transaction via a network communication system.

4. The system of claim 1, wherein the transaction is initiated before the customer receives the new physical card that is approved for the new account.

5. The system of claim 1, wherein the validity parameter is based on a time restriction.

6. The system of claim 1, wherein the validity parameter is based on usage restriction.

7. The system of claim 1, wherein the validity parameter is derived dynamically based on the counter.

8. The system of claim 1, wherein the validity parameter is based on a plurality of factors comprising time and usage.

9. The system of claim 1, wherein the request from the customer is received via a mobile application executing on a customer's mobile device.

10. The system of claim 1, wherein the request from the customer is received via an online website supported by a financial institution associated with the new account.

11. A method that generates a temporal card verification value (CVV2) for secure transaction processing, the method comprising:
    in response to approving a customer for a new physical card that is not connected to an existing account and providing a card number and expiration date for the new physical card to the customer, receiving a request from the customer for a Temporal CVV2 to initiate a transaction with the card number and expiration date wherein the card number is associated with a new account that is newly created for the new physical card,
    wherein a risk level is associated with the transaction;
    in response to determining that the new physical card has not yet been received or activated by the customer, generating, via a crypto generation processor, a unique Temporal CVV2 that is distinct from a CVV2 that is printed on the card and associated with the card number;

applying a counter for the unique Temporal CVV2, wherein the counter is recalculated when a request for a new Temporal CVV2 is received, wherein the Temporal CVV2 comprises a validity parameter, wherein the Temporal CVV2 adds one or more parameters based on the risk level, and wherein the Temporal CVV2 includes one or more restrictions, the one or more restrictions comprising a valid time period and a time limit as well as one or more valid transaction types and one or more approved merchants;

validating, via a crypto validation processor, the Temporal CVV2 to process the transaction, the validation including a determination that the CVV2 meets the one or more restrictions;

communicating, via a secure encryption protocol, the Temporal CVV2 to one or more hardware security servers;

in response to determining that the new physical card has been received or activated by the customer, automatically terminating the unique Temporal CVV2; and when the new physical card expires, reissuing another unique Temporal CVV2, wherein the unique Temporal CVV2 is crypto encrypted, wherein the unique Temporal CVV2 has a maximum number of usage of 1, and wherein both the unique Temporal CVV2 and the CVV2 that is printed on the physical card share same card number and expiration date.

12. The method of claim 11, further comprising: storing and managing, via a memory component, key information associated with the Temporal CVV2.

13. The method of claim 11, wherein the transaction comprises an online transaction via a network communication system.

14. The method of claim 11, wherein the transaction is initiated before the customer receives the new physical card that is approved for the new account.

15. The method of claim 11, wherein the validity parameter is based on a time restriction.

16. The method of claim 11, wherein the validity parameter is based on usage restriction.

17. The method of claim 11, wherein the validity parameter is derived dynamically based on the counter.

18. The method of claim 11, wherein the validity parameter is based on a plurality of factors comprising time and usage.

19. The method of claim 11, wherein the request from the customer is received via a mobile application executing on a customer's mobile device.

20. The method of claim 11, wherein the request from the customer is received via an online website supported by a financial institution associated with the new account.

* * * * *